United States Patent
Andrews et al.

(10) Patent No.: US 8,360,557 B2
(45) Date of Patent: Jan. 29, 2013

(54) METHOD FOR LASER DRILLING FLUID PORTS IN MULTIPLE LAYERS

(75) Inventors: John R. Andrews, Fairport, NY (US); Terrance L. Stephens, Molalla, OR (US); Dan Leo Massopust, Powell Butte, OR (US)

(73) Assignee: Xerox Corporation, Norwalk, CT (US)

( * ) Notice: Subject to any disclaimer, the term of this patent is extended or adjusted under 35 U.S.C. 154(b) by 1029 days.

(21) Appl. No.: 12/329,469

(22) Filed: Dec. 5, 2008

(65) Prior Publication Data

US 2010/0141703 A1 Jun. 10, 2010

(51) Int. Cl.
  *B41J 2/045* (2006.01)
  *H01L 21/02* (2006.01)
  *B23P 17/00* (2006.01)
(52) U.S. Cl. ............................. 347/68; 438/21; 29/890.1
(58) Field of Classification Search .......................... None
  See application file for complete search history.

(56) References Cited

U.S. PATENT DOCUMENTS

2004/0253755 A1* 12/2004 Chen et al. ...................... 438/21

* cited by examiner

*Primary Examiner* — Jerry Rahll
(74) *Attorney, Agent, or Firm* — Marger Johnson & McCollom, P.C.

(57) ABSTRACT

A method includes attaching multiple layers to a back side of at least a portion of a fluid dispensing subassembly having at least one inlet port to form a fluid dispensing assembly, aligning a laser to a region of the fluid dispensing assembly, the region corresponding to the inlet port, and forming at least one hole in the region using a laser, the hole completing a path through the layers to the inlet port. A fluid dispensing assembly has a fluid dispensing subassembly having at least one inlet port, a fluid manifold having at least one outlet, at least two layers between the fluid dispensing subassembly and the manifold, and a fluid path in the at least two layers between the outlet and the inlet port, the fluid path having smooth walls and substantially uniform width.

16 Claims, 4 Drawing Sheets

METHOD FOR LASER DRILLING FLUID PORTS IN MULTIPLE LAYERS

BACKGROUND

Fluid dispensing assemblies generally include structures to take the fluid into the assembly or store it locally, route it to the appropriate output port, an actuator to selectively cause the fluid to exit the output port, and control circuit to control the selection and activation of the actuator. In some instances, the structures to route the ink to the output port and structures upon which the actuators operate may be contained in a fluid dispensing subassembly.

One such fluid dispensing assembly consists of a print head, either for liquid ink or solid inks that are melted. It is generally helpful to have a specific example to understand aspects of the discussion, but no limitation to a print head is intended or should be implied. In the print head example, the fluid dispensing subassembly typically consists of series of metal plates, brazed or otherwise bonded together. For purposes of the discussion here, the jet stack will be considered to consist of at least the membrane upon which the actuators operate, at least one 'body' plate, the term 'body' applying to any plate between the membrane and the nozzle plate, and the nozzle plate that contains the exit ports.

In some instances, print heads include the ink manifolds that store and dispense the ink local to the jet stack. To achieve high density, it is advantageous to remove these internal manifolds. The fluid dispensing assembly still requires some means to transfer ink from an ink reservoir to the output ports.

Ideally, this transfer would occur through a single port for each nozzle in the nozzle plate, for the printhead example, or more generally for each output port. This results in a large number of 'vertical' ports that must pass through multiple layers and maintain alignment. The layers may include the diaphragm or other structure upon which the actuator operates, between the actuators, through any standoffs or insulators, a circuit board for the control circuitry and any heaters needed, such as in solid ink printers. The small dimensions of these inlets make it very difficult to assemble these layers without misalignment, and to maintain uniform fluid characteristics in the presence of any misalignment.

DETAILED DESCRIPTION OF THE EMBODIMENTS

Some fluid dispensing assemblies include a local fluid supply and a fluid dispensing subassembly. The local fluid supply may reside in one or more reservoir chamber or chambers within the fluid dispensing assembly. A print head serves as an example of a fluid dispensing assembly, with a jet stack acting as a fluid dispensing subassembly as will be discussed in more detail later.

The term printer as used here applied to any type of drop-on-demand ejector system in which drops of fluid are forced through one aperture in response to actuation of some sort of transducer. This includes printers, such as thermal ink jet printers, print heads used in applications such as organic electronic circuit fabrication, bioassays, three-dimensional structure building systems, etc. The term 'printhead' is not intended to only apply to printers and no such limitation should be implied. The jet stack resides within the print head of a printer, with the term printer including the examples above.

Figure 1:
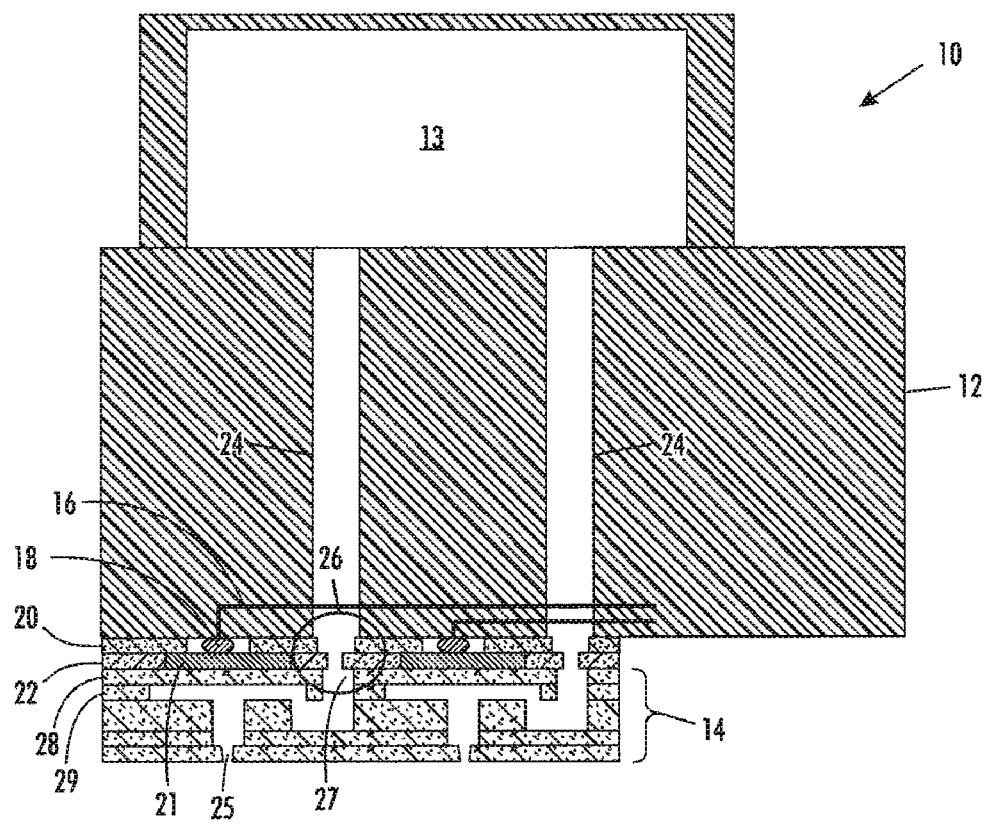
FIG. 1 shows an example of a fluid dispensing assembly having individual jet inlets.

FIG. 1 shows one example of a fluid dispensing assembly. In this instance, for ease of discussion, the fluid dispensing assembly is a print head. The print head 10 has a circuit board 12, through which the ink from the manifold 13 travels to reach the fluid dispensing subassembly 14. In this instance, the fluid dispensing subassembly would consist of the jet stack of the print head.

A fluid dispensing subassembly may be viewed as having several components. First, the driver component may consist of the transducer, such as a piezoelectric transducer 21, that causes the fluid to exit the subassembly, the diaphragm 28 upon which the transducer operates, and the body plate 29 or plates that form the pressure chamber. Second, an inlet component consists of the port hole 24 the path into the jet stack that directs the fluid from the manifold toward the pressure chamber. Next, the outlet component directs the fluid from the pressure chamber to the aperture or nozzle 25. Finally, the aperture dispenses fluid out of the printhead.

In operation, a signal to dispense fluid from a particular nozzle is received, such as through circuit trace 16. This signal is then transmitted through the contact pad and conductive adhesive 18 to the transducer 21 in the transducer layer 22. When the transducer operates, it presses against the diaphragm 28, which then causes the fluid to be ejected through the nozzle 25 onto a print substrate or surface.

Several layers of structures exist between the jet stack and the circuit board. The layer 22 is the transducer layer, which may be a layer of individual transducers 21, such as piezoelectric transducers, aligned with each nozzle in the jet stack. Similarly, the regions between the transducers must also align with the ink inlets 24 through the circuit board 12, as do the existing holes in the diaphragm. This region 26 is shown in more detail in FIG. 2.

Figure 2:
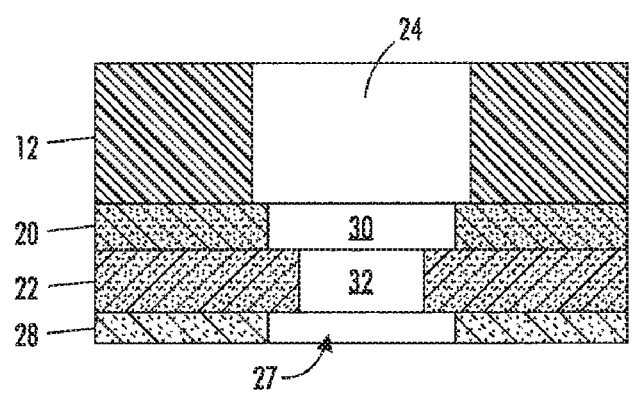
FIG. 2 shows a more detailed example of a fluid dispensing assembly having individual jet inlets.

In FIG. 2, the ink inlet 24 is shown as it passes through the circuit board 12. The standoff 20 and polymer in the transducer layer 22 must have ink port holes 30 and 32 aligned with the ink inlet 24 and the opening 27 in the diaphragm 28.

This gives rise to several problems. For example, higher quality prints require a high density of jets in the jet stack. To provide these jets with the necessary ink requires a high number of inlets that must traverse several layers in the print head. Each of these inlets must have precise alignment to ensure uniform fluid flow across all the jets. Non-uniformities can affect drop size and speed, which in turn may result in lower quality prints, as well as pressure and fluid fluctuations in the print head. In addition, these tight tolerances for alignment increase the cost of manufacture.

It is possible to alleviate these issues by assembling the layers on the back of the jet stack prior to forming the holes for the ink inlets. Once the layers are assembled, the holes could then be formed through all of the layers. In order to accomplish this, the layers would need to be 'drillable' or able to have holes formed in them. One possibility is to form the various layers out of polymers, with any critical components within the polymers laid out to avoid regions where holes would be drilled, but with more relaxed tolerances.

Figure 3:
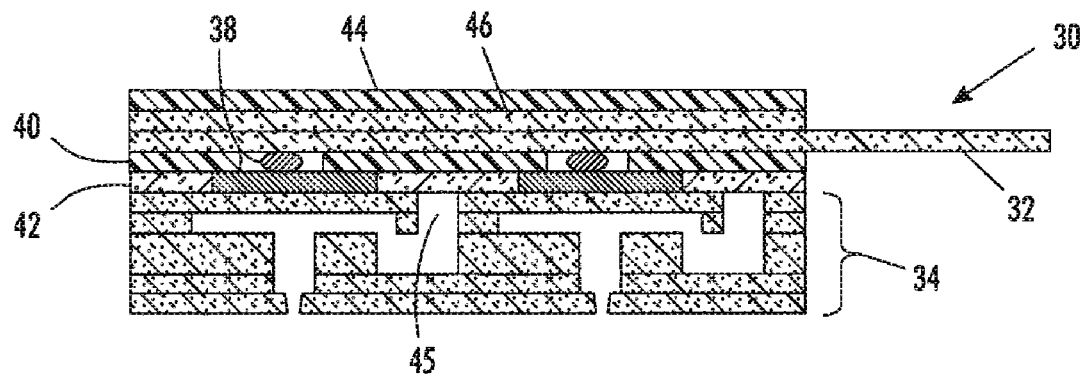
FIG. 3 shows an embodiment of a fluid dispensing assembly able to have the inlets formed after assembly.

FIG. 3 shows a portion of an assembled print head 30 that has not yet undergone formation of the ink inlets. The external manifold is not shown. The jet stack 34 would interface with the remaining layers through the transducer layer 42. The jet stack or fluid dispensing subassembly would have inlet ports 45 to allow the ink to enter the jet stack. As will be discussed in more detail later, the polymer layer may have some advantages during hole formation. The transducer layer 42 would need to align such that the transducers make contact with the conductive adhesive such as 38 in the regions of the standoff 40, but would not require the alignment precision required for the ink inlets. Generally, the transducers will have some sort of interstitial material, such as a polymer cured epoxy or polyimide, between them to planarize the transducer layer.

Similarly, the stand off 40, possibly made of acrylic adhesive, would have pre-cut holes to line up with the transducers, but again, the tolerances are much more relaxed than if they had to align a high density of very small holes for the ink inlets. The standoff will also generally consist of a polymer layer. Further, layers of adhesive are used to attach the layers to the fluid dispensing subassembly and to each other. These adhesives may be cured prior to formation of the holes. However, the layers could be bonded together without full curing of the adhesives. The full cure of the adhesives could take place after the ink inlets are formed.

Use of a flexible circuit substrate 32 may have advantages, although rigid circuit substrates may be used. Flexible circuit substrates, also referred to as flex circuits, will generally consist of circuit traces and passive components on the surface of a polymer substrate such as polyimide. As mentioned previously, the circuit traces may be laid out or positioned such that they will avoid any regions that may be drilled.

The print head portion of FIG. 3 also shows a heater layer 46. For solid, or phase-change ink printers, the ink path is generally heated to maintain the ink in its liquid state. A heater layer made of, for instance, a polyimide substrate with metal heater traces on one or both surfaces may then exist as part of the print head. The heater layer would be arranged such that any metal traces would avoid the regions to be drilled. It must be noted that the aspects of the invention described here are not limited to phase-change ink printers and should not be interpreted as such. The heater layer is therefore optional, but does demonstrate that it is possible to include such structures and still receive the benefits of the embodiments set out here.

Similarly, while it is shown here to demonstrate that several additional layers can still use the aspects of the invention, the manifold attach adhesive 44 is also optional. This would be the adhesive that allows the ink manifold, such as the one shown in FIG. 1, to be attached to the assembled print head structures discussed above. The adhesive layers may come from a number of classes of adhesive including acrylic, epoxy, phenolic, or silicone or combinations thereof. However, the holes for the ink inlets would generally be formed prior to attaching the manifold.

Figure 4:
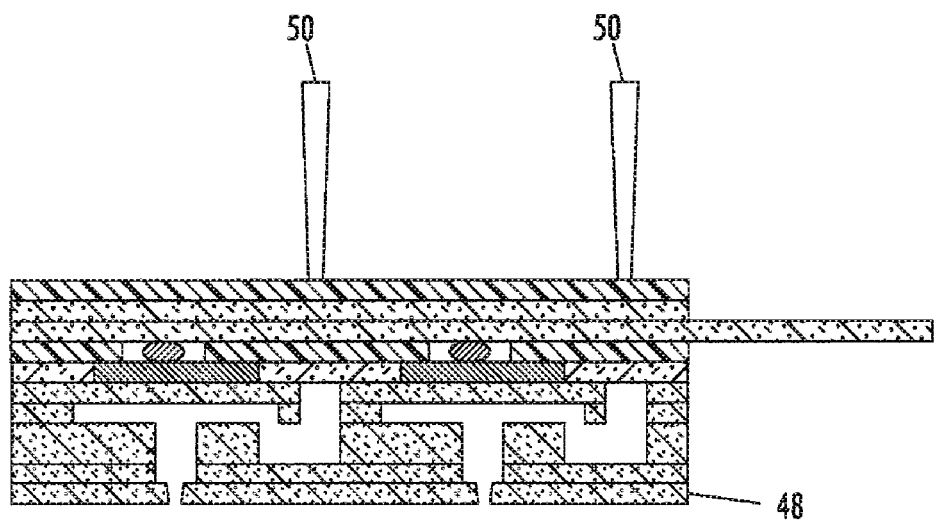
FIG. 4 shows an embodiment of a fluid dispensing assembly undergoing inlet formation.

Once the portion of the print head in FIG. 3 is assembled, the holes can be formed. FIG. 4 shows one embodiment of a method to form the holes by laser. The laser beams such as 50 would drill through or ablate the layers between the manifold attach adhesive and the jet stack. The laser can be aligned to the regions of the print head corresponding to the ink structures in the jet stack using standard vision alignment systems. The holes could then be cut with tight control over the size and shape, guaranteeing the uniformity of the fluid characteristics across the multiple jets of the print head.

In the embodiment of FIG. 4, the holes are drilled from the 'manifold' side of the portion of the print head assembly. This is the side of the print head where the manifold will reside. In one embodiment, the ink inlets are formed with the fluid dispensing subassembly or jet stack fully intact, including the nozzle plate 48.

Figure 5:
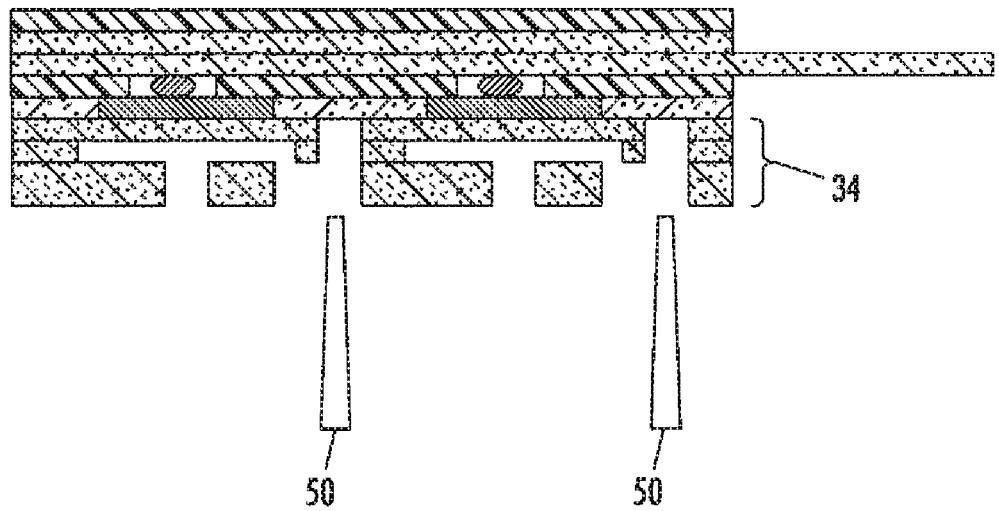
FIG. 5 shows an alternative embodiment of a fluid dispensing assembly undergoing inlet formation.

FIG. 5 shows an embodiment of a hole formation process from the nozzle plate or fluid dispensing subassembly side of the print head, where the nozzle plate itself is not attached to the rest of the fluid dispensing subassembly or jet stack. The laser or other hole forming apparatus would form the holes through the ink paths in the fluid dispensing subassembly that connect to the manifold. The nozzle plate would then be aligned to the outlets of the fluid dispensing subassembly and attached after the holes were formed.

Figure 6:
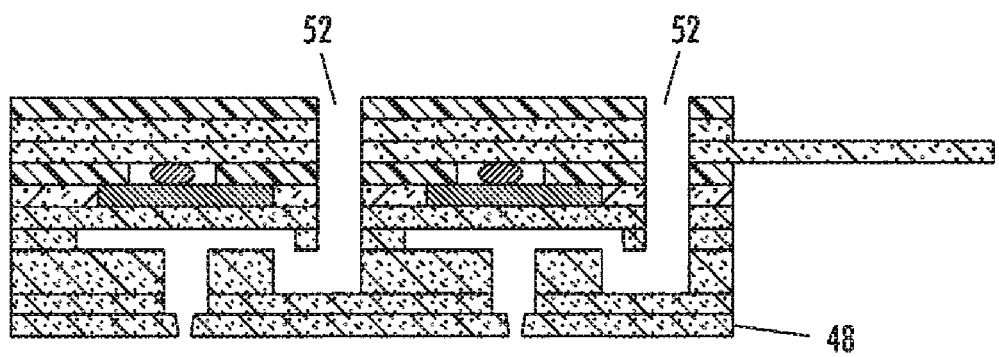
FIG. 6 shows an embodiment of a completed fluid dispensing assembly.

However the holes are formed, whether by laser cutting, ablation or other process, the completed portion of the print head without the manifold would appear something like that shown in FIG. 6. As can be seen, the ink inlets 52 have smooth walls and generally uniform circumference or width. The inlet through the polymer layers can be smaller than the ink inlet in the ink dispensing subassembly. When compared to the alignments of FIG. 1, it can be seen that the features are perfectly aligned laterally. As mentioned above, this alleviates some of the issues with non-uniform fluid flow and resulting image artifacts and system operation issues that result from that non-uniform flow.

There are a several methods for forming the holes. Specific selection of a laser source for hole formation will depend on the composition and physical properties of the material being processed, the thickness of each of the several layers, the overall thickness of the polymer layers, the spatial resolution required, the desired surface quality, and economic considerations such as power consumption, equipment cost, maintenance cost, and processing speed. The range of laser possibilities include, but are not limited to, excimer, $CO_2$, diode pumped solid state, copper vapor and fiber lasers. Both aperture imaging and scanned laser cutting can be used depending upon several factors.

Figure 7:
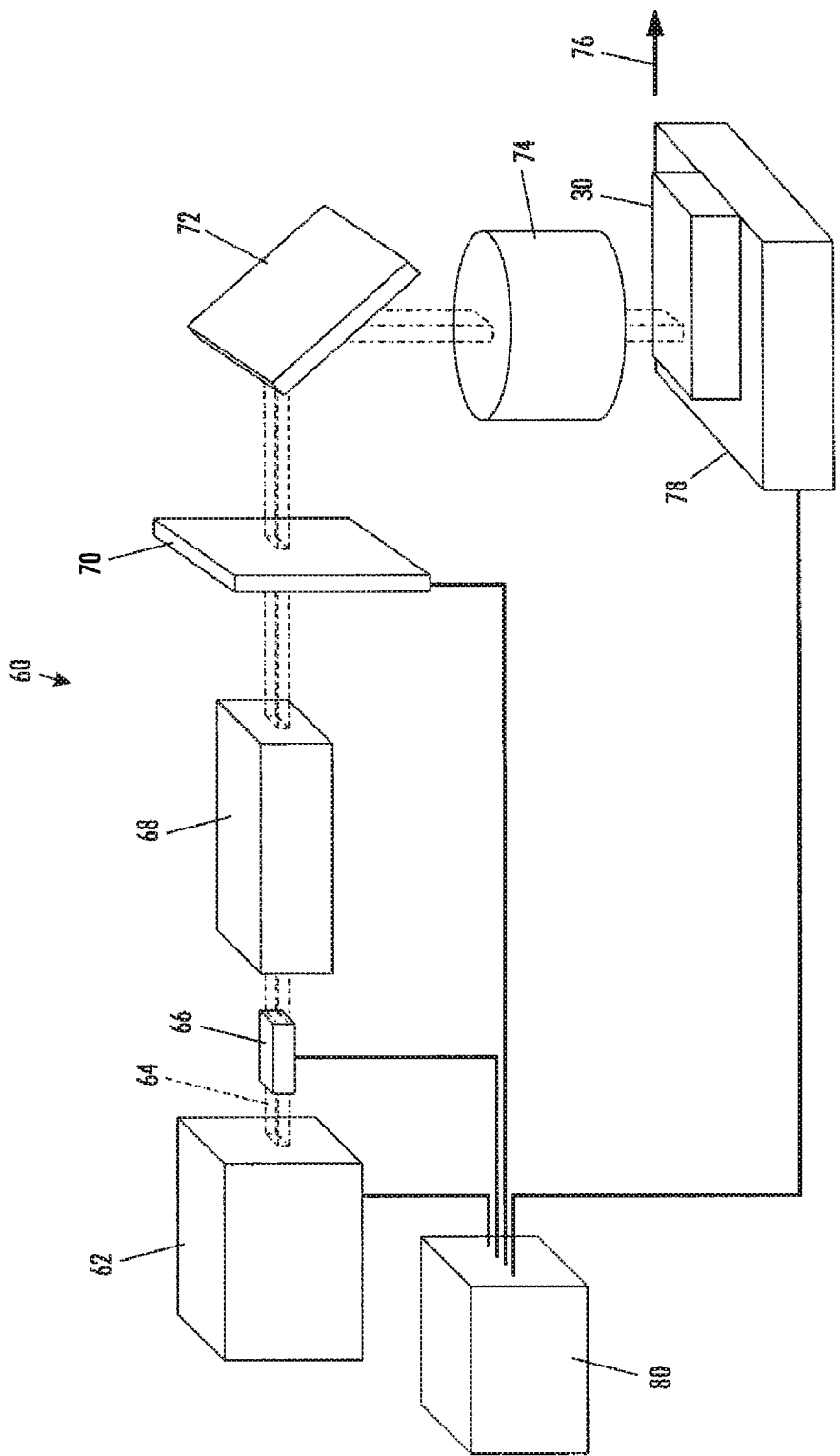
FIG. 7 shows an embodiment of a system for forming inlets.

FIG. 7 shows a system 60 using an image wise ablation method. The laser source 62 emits a laser emission 64, which is processed through a variable attenuator 66 and beam shaping stage 68. The laser passes through a mask 70 that transmits light in the pattern of the cut (not shown). The patterned emission is directed by mirror 72 through an appropriate lens 74, which images the mask onto the print head assemblies such as 30 as shown in FIGS. 3-5. The imaged laser pattern is aligned to the desired location of the ink port holes using vision alignment or other means of registration.

Each of the laser source 62, variable attenuator 66, mask 70 and cutting stage 78 is operably connected to a suitable controller 80. The laser is used to illuminate the mask and forms a laser light image of the area to be cut on the print head assembly. An appropriate number of pulses from the laser source can remove, by an ablation process, the unwanted material. A modification of the imaging method may also scan some combination of the laser beam illuminator, the mask, and the raw material. Each of these methods is encompassed by the present invention, as well as variants thereof that will be apparent to one skilled in the art based on the present disclosure.

In this system, a number of port holes for the ink inlets could be formed simultaneously by the imaged apertures illuminated by the laser. Additional ink ports could be formed by a step and repeat process where the print head is sequentially moved in a precise manner to a new location and the laser activated for each of these locations.

In another embodiment, the laser source 62 could be a diode pumped solid state laser and the laser would be galvanometer scanned to cut each ink port sequentially. All of the ink ports within the field of view of the scanner could be cut sequentially. If the part were larger than the field of view, the part could be moved until all of the port holes have been created It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method, comprising:
   attaching multiple layers to a back side of at least a portion of a fluid dispensing subassembly having at least one inlet port to form a fluid dispensing assembly, wherein attaching multiple layers includes applying a manifold attach adhesive to a top layer of the multiple layers;
   aligning a laser to a region of the fluid dispensing assembly, the region corresponding to the inlet port; and
   forming at least one hole in the region using a laser, the hole completing a path through the layers to the inlet port.

2. The method of claim 1, wherein attaching multiple layers includes attaching an actuator layer having a polymer in at least one space between actuators in the actuator layer, the space corresponding to the inlet port.

3. The method of claim 2, wherein the space between actuators has an interstitial polymer, the polymer being one of epoxy, acrylic, phenolic or silicone or a combination thereof.

4. The method of claim 1, wherein attaching multiple layers includes attaching a heater layer, the heater layer being arranged so any metal traces avoid the region.

5. The method of claim 1, wherein attaching multiple layers includes attaching an electronic circuit, the electronic circuit being arranged so any metal traces do not fully or partially cover the region.

6. The method of claim 1, wherein attaching multiple layers includes using an adhesive to attach at least one layer and curing the adhesives used between the layers prior to forming at least one hole.

7. The method of claim 1, wherein attaching multiple layers includes leaving at least one adhesive layer uncured.

8. The method of claim 1, wherein aligning the laser comprises aligning the laser to a manifold side of the fluid dispensing assembly, and the fluid dispensing subassembly comprises a complete fluid dispensing subassembly.

9. The method of claim 1, wherein forming at least one hole comprising drilling from a manifold side.

10. The method of claim 1, wherein aligning the laser comprises aligning the laser to the inlet port on a portion of the fluid dispensing subassembly.

11. The method of claim 1, wherein forming at least one hole comprises drilling the hole from the fluid dispensing subassembly side through the multiple layers.

12. The method of claim 11, further comprising attaching a nozzle plate onto the fluid dispensing subassembly after drilling.

13. The method of claim 1, wherein forming at least one hole further comprises forming multiple holes simultaneously.

14. The method of claim 1, further comprising repeating the aligning and forming in a step and repeat fashion to form an array of holes corresponding to an array of output ports in the fluid dispensing subassembly.

15. The method of claim 1, wherein forming at least one hole using a laser further comprises using one of an excimer laser, a carbon dioxide laser, a diode pumped solid state laser, a copper vapor laser, or a fiber laser.

16. The method of claim 1, wherein forming at least one hole using a laser further comprises using one of an aperture imaging laser or a scanned laser.

\* \* \* \* \*